US012642174B2

(12) United States Patent
Hunt et al.

(10) Patent No.: US 12,642,174 B2
(45) Date of Patent: Jun. 2, 2026

(54) STUBBLE LEAN DETECTION SYSTEM FOR AN AGRICULTURAL HARVESTER

(71) Applicant: CNH Industrial America LLC, New Holland, PA (US)

(72) Inventors: Cory Douglas Hunt, Millersville, PA (US); Robert J. Garrett, Conestoga, PA (US); Jethro Martin, Ephrata, PA (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 242 days.

(21) Appl. No.: 18/469,195

(22) Filed: Sep. 18, 2023

(65) Prior Publication Data

US 2024/0122106 A1 Apr. 18, 2024

Related U.S. Application Data

(60) Provisional application No. 63/416,024, filed on Oct. 14, 2022.

(51) Int. Cl.
*A01D 41/127* (2006.01)
*A01D 45/02* (2006.01)
*G06T 7/70* (2017.01)

(52) U.S. Cl.
CPC ......... *A01D 41/127* (2013.01); *A01D 45/025* (2013.01); *G06T 7/70* (2017.01); *G06T 2207/30188* (2013.01)

(58) Field of Classification Search
None
See application file for complete search history.

(56) References Cited

U.S. PATENT DOCUMENTS

| | | | |
|---|---|---|---|
| 10,757,859 B2 | 9/2020 | Dima et al. | |
| 2019/0021226 A1* | 1/2019 | Dima | A01D 34/008 |
| 2020/0267899 A1 | 8/2020 | Zielke | |
| 2020/0379479 A1 | 12/2020 | Dima et al. | |
| 2021/0015042 A1* | 1/2021 | Dighton | A01D 41/127 |
| 2021/0084820 A1 | 3/2021 | Vandike et al. | |
| 2021/0137006 A1* | 5/2021 | Shearer | A01D 41/1271 |

(Continued)

FOREIGN PATENT DOCUMENTS

| | | |
|---|---|---|
| CN | 109548472 | 4/2019 |
| DE | 102019207984 | 12/2020 |

(Continued)

OTHER PUBLICATIONS

Extended European Search Report for EP Application No. 23203637.6 dated Mar. 19, 2024 (5 pages).

*Primary Examiner* — Peter D Nolan
*Assistant Examiner* — Michael F Whalen
(74) *Attorney, Agent, or Firm* — FLETCHER YODER, P.C.

(57) ABSTRACT

A stubble lean detection system for an agricultural harvester includes a controller having a memory and a processor. The controller is configured to receive a sensor signal indicative of an image of stubble within an agricultural field. The controller is also configured to determine whether an aggregate direction of lean of the stubble is forward, rearward, or mixed based on the image. Furthermore, the controller is configured to output an information signal to a user interface indicative of instructions to inform an operator of the aggregate direction of lean.

18 Claims, 4 Drawing Sheets

(56)        References Cited

U.S. PATENT DOCUMENTS

2022/0225569 A1      7/2022 Zielke
2023/0000015 A1*     1/2023 Herrmann ............ A01D 41/127

FOREIGN PATENT DOCUMENTS

EP          2545761       1/2013
WO          2019232179 A1   12/2019
WO          2021116802      6/2021
WO          2021116802 A1    6/2021

* cited by examiner

STUBBLE LEAN DETECTION SYSTEM FOR AN AGRICULTURAL HARVESTER

CROSS-REFERENCE TO RELATED APPLICATION

This application claims priority from and the benefit of U.S. Provisional Application Ser. No. 63/416,024, entitled "STUBBLE LEAN DETECTION SYSTEM FOR AN AGRICULTURAL HARVESTER", filed Oct. 14, 2022, which is hereby incorporated by reference in its entirety.

BACKGROUND

The present disclosure relates generally to a stubble lean detection system for an agricultural harvester.

An agricultural harvester may be used to harvest agricultural crops, such as barley, beans, beets, carrots, corn, cotton, flax, oats, potatoes, rye, soybeans, wheat, or other plant crops. The agricultural harvester may include a header, which may be configured to efficiently harvest certain types of crops. For example, a corn header may be configured to efficiently harvest corn. The corn header may include row units that include components configured to separate ears of corn from stalks as the agricultural harvester travels through a field. Conveyors (e.g., augers) carry the ears of corn toward a processing system of the agricultural harvester, and the stalks are deposited on the field.

Certain row units include feed rollers that engage a stalk and drive the stalk downwardly and rearwardly. As the stalk is driven downwardly, the ear engages deck plates positioned above the feed rollers, thereby separating the ear from the stalk. The ear moves rearwardly to the conveyors, and the stalk is deposited on the field.

BRIEF DESCRIPTION

In certain embodiments, a stubble lean detection system for an agricultural harvester includes a controller having a memory and a processor. The controller is configured to receive a sensor signal indicative of an image of stubble within an agricultural field. The controller is also configured to determine whether an aggregate direction of lean of the stubble is forward, rearward, or mixed based on the image. Furthermore, the controller is configured to output an information signal to a user interface indicative of instructions to inform an operator of the aggregate direction of lean.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
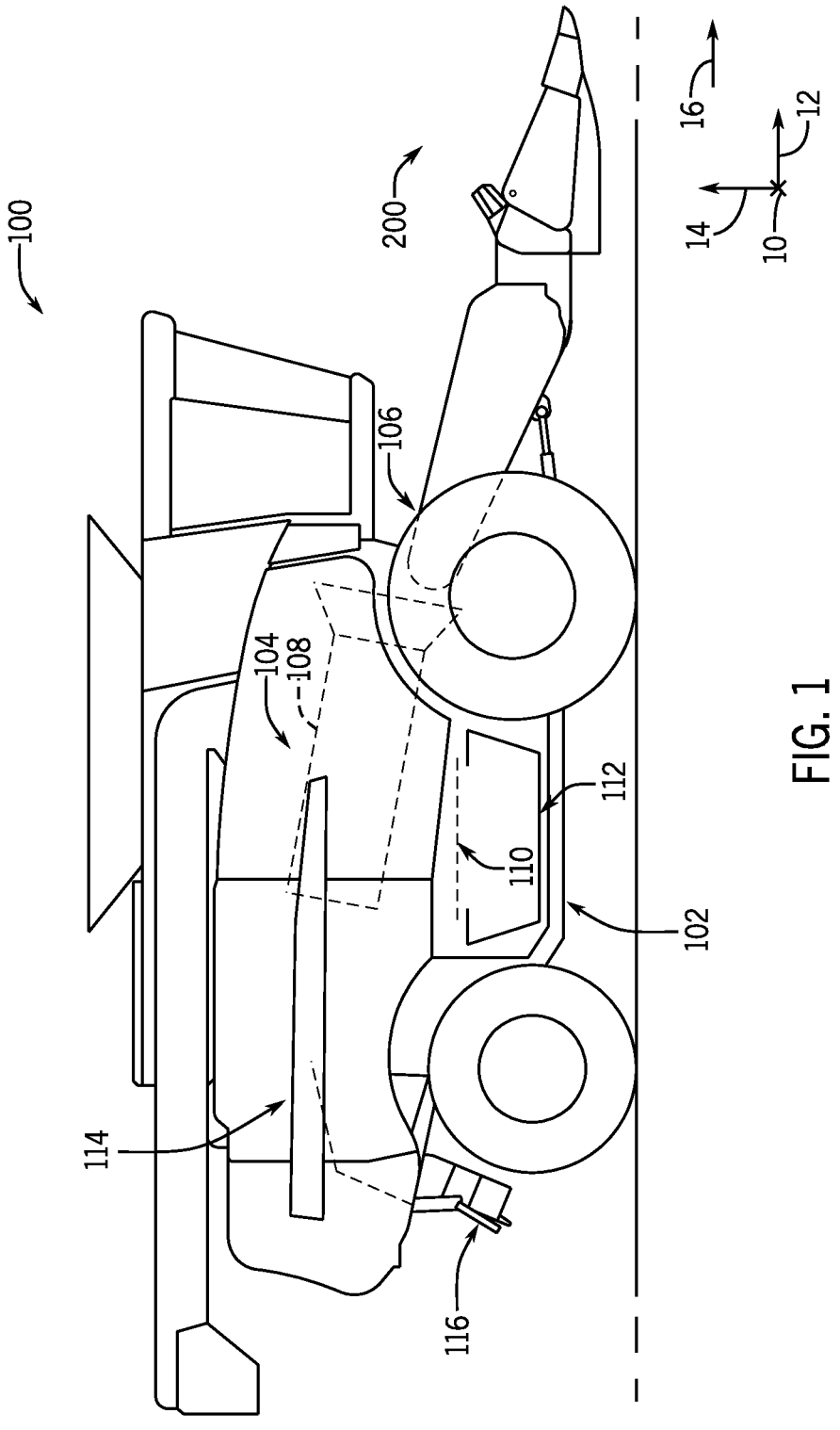
FIG. 1 is a side view of an embodiment of an agricultural harvester having a corn header.

FIG. 1 is a side view of an embodiment of an agricultural harvester 100 having a corn header 200 (e.g., agricultural header). The agricultural harvester 100 includes a chassis 102 configured to support the corn header 200 and an agricultural crop processing system 104. As described in greater detail below, the corn header 200 is configured to separate ears of corn from stalks and to transport the ears of corn toward an inlet 106 of the agricultural crop processing system 104 for further processing of the ears of corn. The agricultural crop processing system 104 receives the ears of corn from the header 200 and separates desired crop material from crop residue. For example, the agricultural crop processing system 104 may include a thresher 108 having a cylindrical threshing rotor that transports the ears of corn in a helical flow path through the agricultural harvester 100. In addition to transporting the ears of corn, the thresher 108 may separate certain desired crop material (e.g., corn kernels) from the crop residue, such as husks and cobs, and enable the desired crop material to flow into a cleaning system 114 located beneath the thresher 108. The cleaning system 114 may remove debris from the desired crop material and transport the desired crop material to a storage compartment 112 within the agricultural harvester 100. The crop residue may be transported from the thresher 108 to a crop residue handling system 114, which may remove the crop residue from the agricultural harvester 100 via a crop residue spreading system 116 positioned at the aft end of the agricultural harvester 100.

As discussed in detail below, the header 200 includes multiple row units configured to separate ears of corn from stalks, thereby leaving bare stalks engaged with the soil. The ears of corn are directed toward the inlet 106. The bare stalks that remain engaged with the soil may be collectively referred to as stubble. To facilitate discussion, the agricultural harvester 100 and/or its components (e.g., the corn header 200) may be described with reference to a lateral axis or direction 10, a longitudinal axis or direction 12, and a vertical axis or direction 14. The agricultural harvester 100 and/or its components (e.g., the corn header 200) may also be described with reference to a direction of travel 16.

As discussed in detail below, in certain embodiments, the agricultural harvester 100 includes a stubble lean detection system. The stubble lean detection system includes a controller having a memory and a processor. The controller is configured to receive a sensor signal indicative of an image of stubble within the agricultural field. In addition, the controller is configured to determine whether an aggregate direction of lean of the stubble is forward, rearward, or mixed based on the image. The controller is also configured to output an information signal to a user interface indicative of instructions to inform an operator of the aggregate direction of lean. In certain embodiments, the controller is configured to determine whether the aggregate direction of lean of the stubble is forward, rearward, or mixed via machine learning. If the aggregate direction of lean of the stubble is forward, the ground speed of the agricultural harvester may be greater than the rearward speed of the stalks. Accordingly, upon being informed that the aggregate direction of lean is forward, the operator may reduce the ground speed of the agricultural harvester and/or increase the rearward speed of the stalks (e.g., by increasing a pitch angle of the feed rollers relative to the agricultural field and/or by increasing the speed of the feed rollers). Furthermore, if the aggregate direction of lean of the stubble is rearward, the ground speed of the agricultural harvester may be less than the rearward speed of the stalks. Accordingly, upon being informed that the aggregate direction of lean is rearward, the operator may increase the ground speed of the agricultural harvester and/or reduce the rearward speed of the stalks (e.g., by decreasing the pitch angle of the feed rollers relative to the agricultural field and/or by reducing the speed of the feed rollers). As a result, the ground speed of the agricultural harvester may substantially match the rearward speed of the stalks, thereby enhancing the efficiency of the harvesting operation and/or enhancing subsequent agricultural operation(s).

Figure 2:
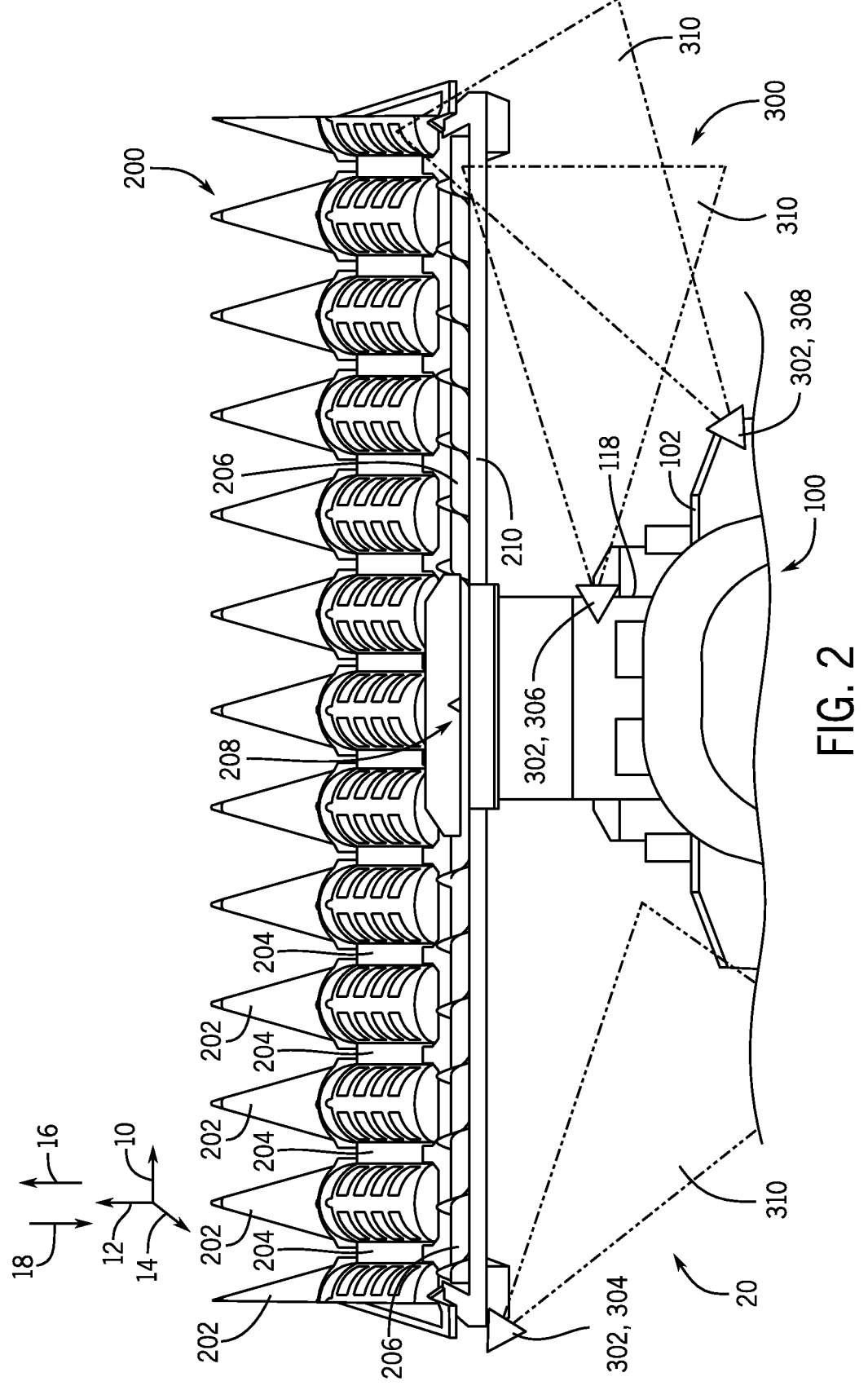
FIG. 2 is a perspective view of an embodiment of a corn header that may be employed within the agricultural harvester of FIG. 1.

FIG. 2 is a perspective view of an embodiment of a corn header 200 that may be employed within the agricultural harvester 100 of FIG. 1. In the illustrated embodiment, the corn header 200 includes multiple dividers 202 configured to divide rows of a crop (e.g., corn). The dividers 202 may be evenly spaced along the lateral axis 10 of the corn header 200. As the corn header 200 moves along the direction of travel 16, the dividers 202 may direct crops from each row to a respective row unit 204. The row units 204 are configured to separate ears of corn from stalks, thereby leaving bare stalks engaged with the soil (e.g., stubble). The ears of corn may be directed to one of a pair of augers 206 configured to convey the ears of corn inwardly along the lateral axis 10 to a conveyor 208 at the lateral center of the corn header 200. As illustrated, the augers 206 extend along a substantial portion of the width of the corn header 200 (e.g., along the lateral axis 10). The augers 206 may be driven by a driving mechanism (e.g., electric motor, hydraulic motor, etc.). As the agricultural harvester 100 moves through the field, the dividers 202 direct the rows of crops into the row units 204. The row units 204 engage the crops within the field and separate the ears of corn from the stalks, and the augers 206 transport the ears of corn to the conveyor 208, which directs the ears of corn toward the inlet of the agricultural crop processing system. Each row unit 204 includes feed rollers which pull the stalk of each crop downwardly through the row unit during harvesting. As the stalks of the crops are pulled through the feed rollers, the ears are separated from the stalks and are conveyed toward the augers 206.

In addition to pulling the stalks of the crops downwardly, the feed rollers drive the stalks rearwardly (e.g., along a rearward direction 18 opposite the direction of travel 16) relative to a frame 210 of the corn header 200. Due to the movement of the agricultural harvester 100, the frame 210 of the corn header 200 is driven to move forwardly along the direction of travel 16. The difference between the forward speed of the corn header frame 210 relative to the agricultural field and the rearward speed of the stalks relative to the corn header frame 210 may be referred to as the conveyance speed. A conveyance speed of about zero may enhance the efficiency of the harvesting operation (e.g., by reducing the loads/forces applied to the ears) and/or may enhance subsequent agricultural operation(s) (e.g., by enhancing the engagement of the bare stalks with the soil). If the conveyance speed is about zero, the bare stalks engaged with the soil of the agricultural field may lean in mixed directions, including forward and rearward. For example, the portion of the bare stalks engaged with the soil that lean forwardly may be about equal to the portion of the bare stalks engaged with the soil that lean rearwardly (e.g., within 20 percent of one another, within 15 percent of one another, within 10 percent of one another, within 5 percent of one another, etc.). If the forward speed of the corn header frame 210 relative to the agricultural field is greater than the rearward speed of the stalks relative to the corn header frame 210, a larger portion of the bare stalks engaged with the soil may lean forwardly (e.g., 60 percent, 70 percent, 80 percent, 90 percent, 95 percent, etc.), and a smaller portion of the bare stalks engaged with the soil may lean rearwardly. Furthermore, if the rearward speed of the stalks relative to the corn header frame 210 is greater than the forward speed of the corn header frame 210 relative to the agricultural field, a larger portion of the bare stalks engaged with the soil may lean rearwardly (e.g., 60 percent, 70 percent, 80 percent, 90 percent, 95 percent, etc.), and a smaller portion of the bare stalks engaged with the soil may lean forwardly. As used herein with regard to bare stalks, "engaged with soil" refers to stalks that have had the ears removed by the corn header and remain engaged with the soil by roots extending from the stalks into the soil. Furthermore, as used herein with regard to the direction of lean, "forward"/"forwardly" refers to an orientation of a bare stalk engaged with the soil of less than 90 degrees relative to the direction of travel 16, and "rearward"/"rearwardly" refers to an orientation of a bare stalk engaged with the soil of less than 90 degrees relative to the rearward direction 18.

In certain embodiments, the agricultural harvester 100 includes a stubble lean detection system 300 (e.g., control system). The stubble lean detection system 300 includes a controller having a memory and a processor. The controller is configured to receive a sensor signal indicative of an image of stubble within the agricultural field. In addition, the controller is configured to determine whether an aggregate direction of lean of the stubble is forward, rearward, or mixed based on the image. As used herein, "aggregate direction of lean of the stubble" refers to the direction of lean of a majority (i.e., greater than 50 percent) of the bare stalks engaged with the soil.

In certain embodiments, the controller is configured to output an information signal to a user interface indicative of instructions to inform an operator of the aggregate direction of lean. As previously discussed, if the aggregate direction of lean of the stubble is forward, the forward speed of the corn header frame 210 relative to the agricultural field may be greater than the rearward speed of the stalks relative to the corn header frame 210. Accordingly, upon being informed that the aggregate direction of lean is forward, the operator may reduce the ground speed of the agricultural harvester (e.g., along the direction of travel 16) and/or increase the rearward speed of the stalks (e.g., by increasing a pitch angle of the feed rollers relative to the agricultural field and/or by increasing the speed of the feed rollers).

Furthermore, if the aggregate direction of lean of the stubble is rearward, the rearward speed of the stalks relative to the corn header frame 210 may be greater than the forward speed of the corn header frame 210 relative to the agricultural field. Accordingly, upon being informed that the aggregate direction of lean is rearward, the operator may increase the ground speed of the agricultural harvester (e.g., along the direction of travel 16) and/or reduce the rearward speed of the stalks (e.g., by decreasing the pitch angle of the feed rollers relative to the agricultural field and/or by reducing the speed of the feed rollers). As a result, the ground speed of the agricultural harvester may substantially match (e.g., be within a target percentage of) the rearward speed of the stalks, thereby enhancing the efficiency of the harvesting operation and/or enhancing subsequent agricultural operation(s).

Furthermore, in certain embodiments, the controller is configured to control the conveyance speed of the stalks relative to the agricultural field based on the aggregate direction of lean. For example, the conveyance speed may be controlled by controlling the ground speed of the agricultural harvester (e.g., along the direction of travel 16), a pitch angle of the feed rollers relative to the agricultural field, a speed of the feed rollers, other suitable operational parameter(s), or a combination thereof. In certain embodiments, the controller may be configured to control an agricultural harvester speed control system to decrease the ground speed of the agricultural harvester in response to determining the aggregate direction of lean is forward, and the controller may be configured to control the agricultural harvester speed control system to increase the ground speed of the agricultural harvester in response to determining the aggregate direction of lean is rearward. In addition, in certain embodiments, the controller may be configured to control a feed roller angle actuator to increase the pitch angle of the feed rollers relative to the agricultural field in response to determining the aggregate direction of lean is forward, and the controller may be configured to control the feed roller angle actuator to decrease the pitch angle of the feed rollers relative to the agricultural field in response to determining the aggregate direction of lean is rearward. Furthermore, in certain embodiments, the controller may be configured to control a feed roller speed actuator to increase the speed of the feed rollers in response to determining the aggregate direction of lean is forward, and the controller may be configured to control the feed roller speed actuator to decrease the speed of the feed rollers in response to determining the aggregate direction of lean is rearward.

In the illustrated embodiment, the stubble lean detection system 300 includes multiple cameras 302, and each camera 302 is configured to output a respective sensor signal indicative of an image of the stubble (e.g., bare stalks engaged with the soil) within the agricultural field. Each camera 302 may monitor the stubble within any suitable range of the electromagnetic spectrum. For example, at least one camera may be configured to monitor the stubble within the visible light spectrum and output a respective sensor signal indicative of a visible light image. Additionally or alternatively, at least one camera may be configured to monitor the stubble within an infrared spectrum and output a respective sensor signal indicative of an infrared image. For example, in certain operating conditions, an infrared image may provide enhanced contrast between the stubble and the soil (e.g., as compared to a visible light image) due to a temperature difference between the stubble and the soil. In the illustrated embodiment, each camera 302 is directed toward a region of the agricultural field between the corn header 200 and the crop residue spreading system of the agricultural harvester 100 (e.g., along the direction of travel 16). Accordingly, each camera may monitor the stubble after the ears have been removed from the stalks and before residue is deposited on the stubble, thereby increasing the contrast between the stubble and the soil (e.g., as compared to directing a camera toward a region aft of the crop residue spreading system). While each camera 302 is directed toward the region between the corn header and the crop residue spreading system in the illustrated embodiment, in other embodiments, at least one camera may be directed toward a region aft of the crop residue spreading system (e.g., along the direction of travel 16).

In the illustrated embodiment, the stubble lean detection system 300 includes three cameras 302. A first camera 304 is coupled to the header frame 210, a second camera 306 is coupled to a feeder house 118 of the agricultural harvester 100, and a third camera 308 is coupled to the chassis 102 of the agricultural harvester 100. While cameras are coupled to the header frame, the feeder house, and the chassis in the illustrated embodiment, in other embodiments, one or more cameras may be coupled to any other suitable structure(s) of the agricultural harvester (e.g., the cab, a body panel, etc.). Furthermore, while the stubble lean detection system 300 includes three cameras 302 in the illustrated embodiment, in other embodiments, the stubble lean detection system may include more or fewer cameras (e.g., 1, 2, 4, or more).

In the illustrated embodiment, each camera 302 is directed generally along the lateral axis 10 of the agricultural harvester 100/corn header 200. As used herein with regard to each camera, "directed generally along the lateral axis" refers to orienting a center of a field of view 310 of the camera 302 within a threshold range of the lateral axis 10 (e.g., within 45 degrees of the lateral axis, within 30 degrees of the lateral axis, within 15 degrees of the lateral axis, within 10 degrees of the lateral axis, within 5 degrees of the lateral axis, within 1 degree of the lateral axis). By directing each camera 302 generally along the lateral axis 10, the camera 302 may effectively monitor the forward/rearward direction of lean of the stubble. While each camera 302 is directed generally along the lateral axis 10 in the illustrated embodiment, in other embodiments, at least one camera may be directed in another suitable direction.

Furthermore, in the illustrated embodiment, each camera 302 is positioned below a center of the agricultural harvester 100 along the vertical axis 14. As a result, the camera may effectively capture an image of the forward/rearward lean of the stubble, thereby facilitating the process of determining the forward/rearward lean of the stubble. While each camera 302 is positioned below the center of the agricultural harvester 100 along the vertical axis 14 in the illustrated embodiment, in other embodiments, at least one camera may be positioned at or above the center of the agricultural harvester along the vertical axis.

In the illustrated embodiment, the second camera 306 and the third camera 308 are directed laterally outward from the agricultural harvester, and the first camera 304 is directed laterally inward. Each camera 302 is configured to output a sensor signal indicative of an image of stubble within the field of view 310 of the camera 302. Accordingly, each camera may be oriented (e.g., downwardly, substantially parallel to the agricultural field) such that the agricultural field and the stubble are present within at least a portion (e.g., a substantial portion, all) of the field of view of the camera. In the illustrated embodiment, the first camera 304 is directed toward the chassis 102 of the agricultural harvester 100, which is positioned on an opposite side of the stubble from the first camera 304. Accordingly, the contrast between the stubble and the background (e.g., the chassis 102) may be enhanced (e.g., as compared to a camera directed toward the environment, in which the sky forms the background), thereby facilitating identification of the forward/rearward direction of lean of the stubble. While the first camera 304 is directed toward the chassis 102 in the illustrated embodiment, in other embodiments, the first camera may be directed toward other/additional suitable element(s) of the agricultural harvester (e.g., alone or in combination with the chassis), such as a wheel/tire, the feeder house, the header frame, other suitable element(s) of the agricultural harvester, or a combination thereof. Furthermore, additional camera(s) (e.g., the second camera and/or the third camera) may be directed toward element(s) of the agricultural harvester positioned on the opposite side of the stubble from the camera(s). In addition, in certain embodiments, the first camera may not be directed toward element(s) of the agricultural harvester positioned on the opposite side of the stubble from the camera.

In certain embodiments, at least one camera may have a depth of field less than a threshold value to reduce extraneous element(s) within the respective field of view. For example, the depth of field may be selected, such that the stubble is relatively clear in the image, and the extraneous element(s) (e.g., element(s) of the agricultural harvester, the sky, etc.) are relatively blurry, thereby facilitating the process of determining the forward/rearward lean of the stubble. In certain embodiments, the threshold value for the depth of field may be selected based on the position of the camera, the dimensions of the agricultural harvester, other suitable parameter(s), or a combination thereof. For example, in certain embodiments, the depth of field of at least one camera may be less than 5 meters, less than 4 meters, less than 3 meters, less than 2 meters, less than 1 meter, or less than 0.5 meters. Furthermore, in certain embodiments, different cameras may have different depths of field. In addition, in certain embodiments, at least one camera may have a long depth of field (e.g., maximum depth of field of the camera lens).

While the stubble lean detection system 300 includes camera(s) 302 in the illustrated embodiment, in other embodiments, the stubble lean detection system may include other suitable sensor(s) (e.g., alone or in combination with the camera(s)) configured to output sensor signal(s) indicative of image(s) of the stubble within the agricultural field. For example, in certain embodiments, the stubble lean detection system may include one or more lidar sensors, and each lidar sensor may be configured to output a sensor signal indicative of a respective image of the stubble (e.g., as a point cloud, etc.). Furthermore, in certain embodiments, the stubble lean detection system may include one or more radar sensors, and each radar sensor may be configured to output a sensor signal indicative of a respective image of the stubble (e.g., as a radar image).

Figure 3:
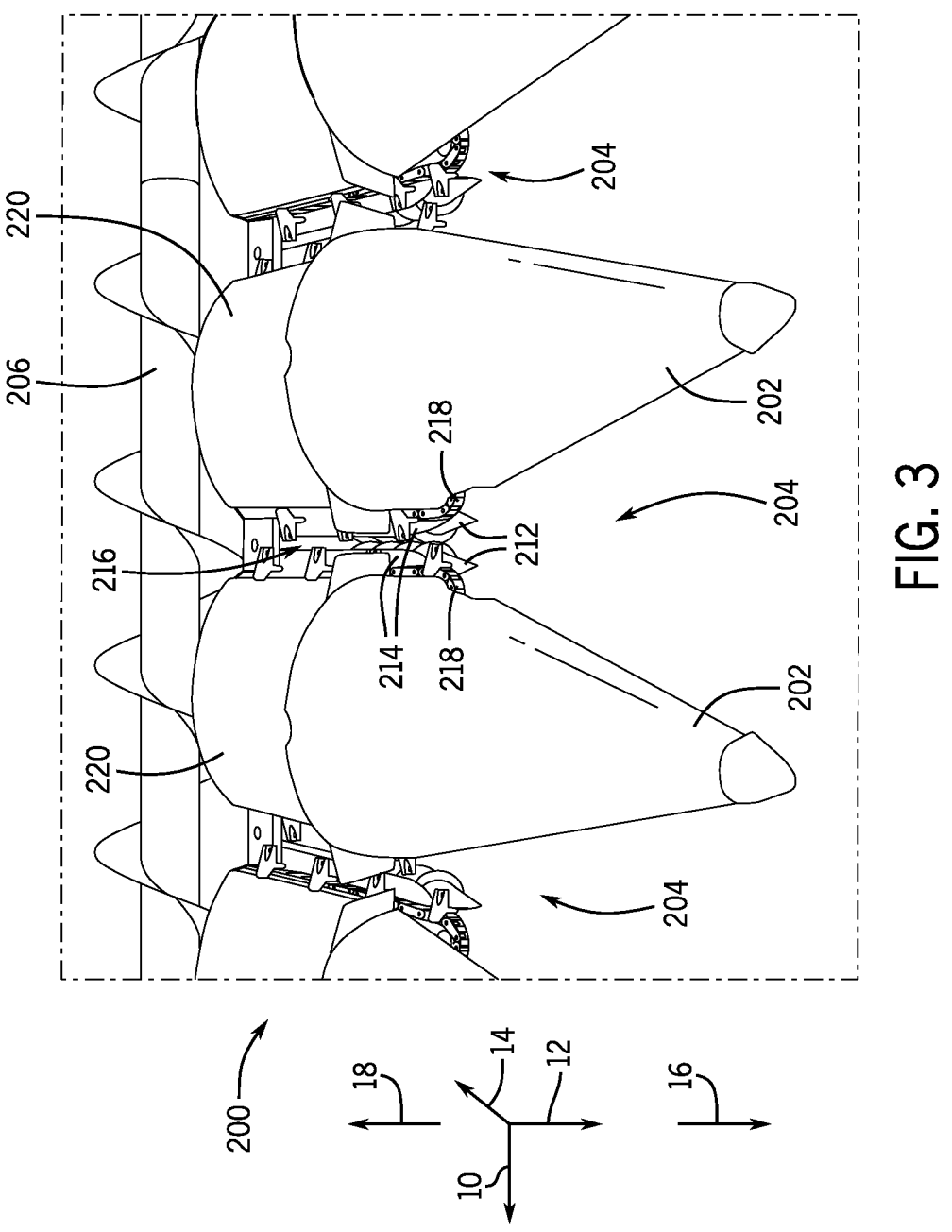
FIG. 3 is a perspective front view of a portion of the corn header of FIG. 2.

FIG. 3 is a perspective front view of a portion of the corn header 200 of FIG. 2. As previously discussed, the corn header 200 includes multiple dividers 202 that direct the crops to the row units 204. Each row unit 204 is configured to separate the corn ear from the stalk, carry the corn ear toward the respective auger 206, and direct the stalk to the field. As illustrated, each row unit 204 includes a pair of feed rollers 212 configured to grip the stalk and to rotate in opposite directions, thereby driving the stalk rearwardly (e.g., along the rearward direction 18) and toward the field (e.g., vertically downward; below the header 200). Each row unit 204 also includes a pair of deck plates 214 positioned over the pair of feed rollers 212. Each deck plate 214 extends along the longitudinal axis 12 of the corn header 200, and the pair of deck plates 214 are separated from one another along the lateral axis 10 to define a gap 216. Further, each row unit 204 includes a pair of chains 218 (e.g., with lugs) that are configured to drive or push the corn ear along the pair of deck plates 214 toward the respective auger 206. The pair of deck plates 214 are spaced apart so that the gap 216 is sized to enable the stalk to fall through the gap 216 and to block the corn ear from falling through the gap 216. In some embodiments, the pair of deck plates are adjustable and may be driven (e.g., via an actuator) toward and away from one another along the lateral axis 10 to change a size (e.g., width) of the gap. A hood 220 is positioned rearward of each divider 202 and between adjacent row units 204 to cover various components, such as the actuator that drives the pair of deck plates 214, linkage(s), and so forth. While each row unit includes feed rollers 212, deck plates 214, and chains 218 in the illustrated embodiment, in other embodiments, at least one row unit may include other/additional suitable component(s) configured to facilitate separating the corn ear from the stalk, directing the corn ear to the respective auger, and directing the stalk to the surface of the agricultural field.

As discussed in detail below, a controller of the stubble lean detection system (e.g., control system) is configured to determine whether an aggregate direction of lean of the stubble is forward, rearward, or mixed based on an image of the stubble within the agricultural field. In addition, in certain embodiments, the controller is configured to control a conveyance speed of the stalks relative to the agricultural field based on the aggregate direction of lean of the stubble. In such embodiments, the controller may control a feed roller speed actuator to increase the speed of the feed rollers 212 in response to determining the aggregate direction of lean is forward, and the controller may control the feed roller speed actuator to decrease the speed of the feed rollers 212 in response to determining the aggregate direction of lean is rearward. Additionally or alternatively, the controller may control a feed roller angle actuator to increase the pitch angle of the feed rollers 212 relative to the agricultural field in response to determining the aggregate direction of lean is forward, and the controller may control the feed roller angle actuator to decrease the pitch angle of the feed rollers 212 relative to the agricultural field in response to determining the aggregate direction of lean is rearward.

Figure 4:
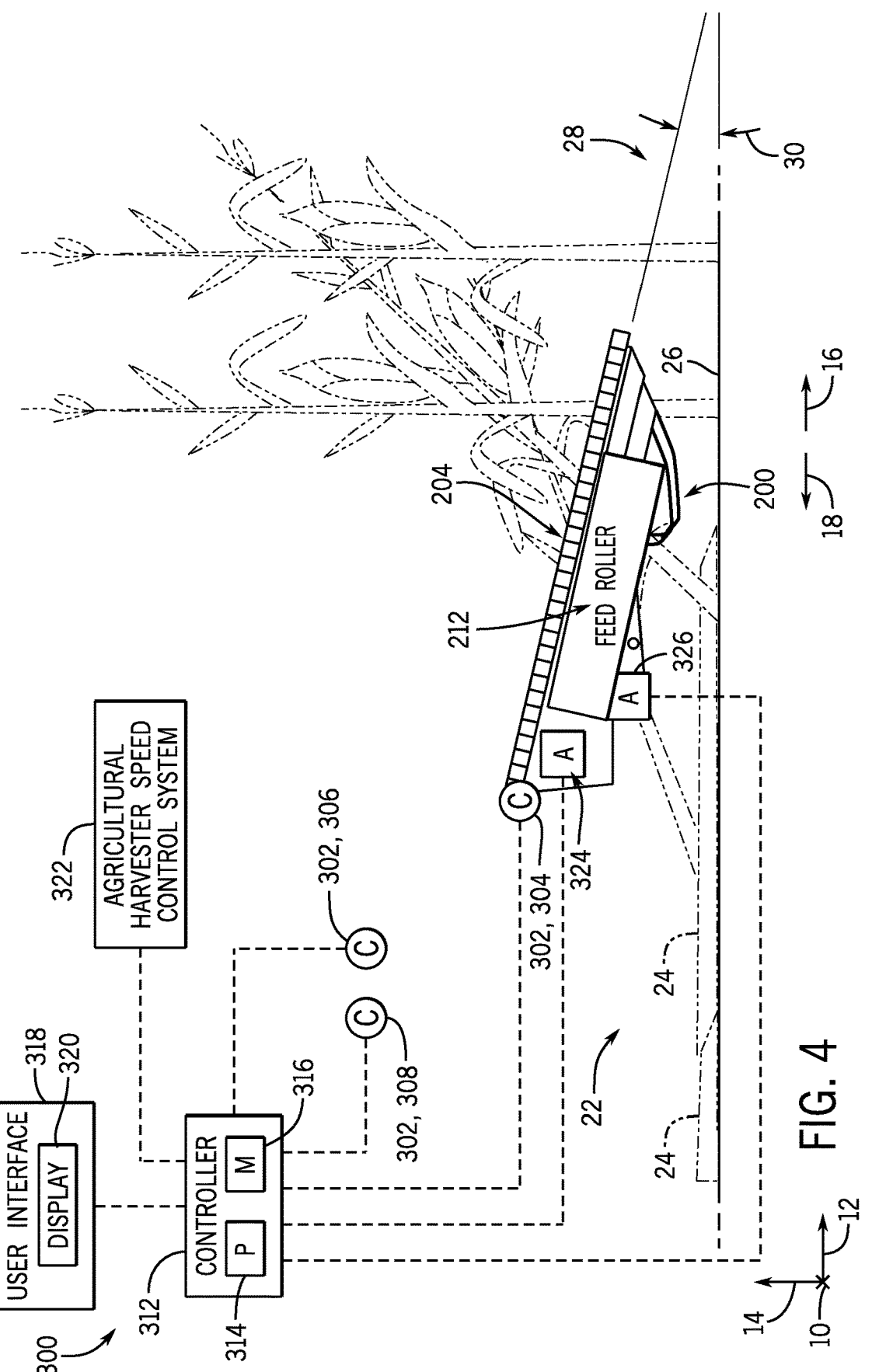
FIG. 4 is a schematic view of an embodiment of a stubble lean detection system that may be employed within the agricultural harvester of FIG. 1.

FIG. 4 is a schematic view of an embodiment of a stubble lean detection system (e.g., control system) 300 that may be employed within the agricultural harvester of FIG. 1. In the illustrated embodiment, the stubble lean detection system 300 includes a controller 312 configured to determine a direction of lean of the stubble within the agricultural field. In certain embodiments, the controller 312 is an electronic controller having electrical circuitry configured to receive sensor signal(s) from the camera(s) 302 indicative of image(s) of stubble and to determine the direction of lean based on the images. In the illustrated embodiment, the controller 312 includes a processor, such as the illustrated microprocessor 314, and a memory device 316. The controller 312 may also include one or more storage devices and/or other suitable components. The processor 314 may be used to execute software, such as software for determining the direction of lean of the stubble, and so forth. Moreover, the processor 314 may include multiple microprocessors, one or more "general-purpose" microprocessors, one or more special-purpose microprocessors, and/or one or more application specific integrated circuits (ASICs), or some combination thereof. For example, the processor 314 may include one or more reduced instruction set (RISC) processors.

The memory device 316 may include a volatile memory, such as random access memory (RAM), and/or a nonvolatile memory, such as read-only memory (ROM). The memory device 316 may store a variety of information and may be used for various purposes. For example, the memory device 316 may store processor-executable instructions (e.g., firmware or software) for the processor 314 to execute, such as instructions for determining the direction of lean of the stubble, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for determining the direction of lean of the stubble, etc.), and any other suitable data.

In the illustrated embodiment, the cameras 302 are communicatively coupled to the controller 312. As previously discussed, each camera 302 is configured to output a respective sensor signal indicative of an image of the stubble 22 (e.g., bare stalks 24 engaged with the soil 26). In certain embodiments, the controller 312 is configured to receive the sensor signal(s) indicative of image(s) of the stubble 22 within the agricultural field 28 from the camera(s) 302, and the controller 312 is configured to determine whether an aggregate direction of lean of the stubble 22 is forward, rearward, or mixed based on the image(s). For example, in certain embodiments, the stubble lean detection system may include a single camera, and the controller may be configured to receive a sensor signal indicative of an image of the stubble from the single camera. In such embodiments, the controller may determine whether an aggregate direction of lean of the stubble is forward, rearward, or mixed based on the image. Furthermore, in certain embodiments, the stubble lean detection system may include multiple cameras, and the controller may be configured to receive sensor signals indicative of images of the stubble from the cameras. In such embodiments, the controller may determine whether an aggregate direction of lean of the stubble is forward, rearward, or mixed based on the images. In addition, while the controller receives sensor signal(s) indicative of image(s) of the stubble from the camera(s) in the illustrated embodiment, in other embodiments, the controller may receive sensor signal(s) indicative of image(s) of the stubble from other suitable sensor(s) (e.g., alone or in combination with the camera(s)), such as the lidar sensor(s) and/or the radar sensor(s) discussed above with reference to FIG. 2.

Furthermore, in certain embodiments, the controller 312 is configured to determine a direction of lean of at least one bare stalk engaged with the soil of the agricultural field based on image(s) from the sensor(s) (e.g., camera(s), etc.). For example, the controller 312 may identify a bare stalk 24 of the stubble 22 within an image and determine the direction of lean of the bare stalk 24 (e.g., whether the identified bare stalk 24 is leaning forwardly or rearwardly, an angle of the identified bare stalk 24 relative to the direction of travel 16) based on the image. Furthermore, in certain embodiments, the controller may identify multiple bare stalks of the stubble within image(s) and determine the direction of lean of each identified stalk (e.g., whether each identified bare stalk is leaning forwardly or rearwardly, an angle of each identified bare stalk relative to the direction of travel) based on the image(s). In such embodiments, the controller may determine an aggregate direction of lean of the stubble (e.g., direction of lean of the bare stalks engaged with the soil)

based on the direction of lean of each identified bare stalk. For example, the controller may determine whether the aggregate direction of lean of the stubble is forward, rearward, or mixed based on the direction of lean of each identified bare stalk. Additionally or alternatively, the controller may determine an average direction of lean of the bare stalks engaged with the soil relative to the direction of travel (e.g., direction of lean of the bare stalks) based on the direction of lean of each identified bare stalk. For example, the controller may determine an angle of each identified bare stalk relative to the direction of travel, and the controller may average the angles to determine the average direction of lean of the bare stalks engaged with the soil. In certain embodiments, the controller may also determine whether the average direction of lean is forward or rearward based on the average direction of lean relative to the forward direction of travel. While determining an aggregate direction of lean and an average direction of lean is disclosed above, in certain embodiments, the controller may be configured to determine another suitable direction of lean based on the direction of lean of each identified bare stalk (e.g., based on a statistical analysis of the directions of lean of the identified bare stalks).

The controller 312 may determine the aggregate direction of lean/the direction of lean/the average direction of lean based on the image(s) using any suitable image processing technique(s). For example, in certain embodiments, the controller 312 may determine the aggregate direction of lean/the direction of lean/the average direction of lean, at least in part, by artificial intelligence, such as via machine learning. For example, data corresponding to various images of stalk/stubble lean may be used (e.g., by the controller) to train a machine learning process (e.g., stored within the controller). The controller 312 may then analyze a new image (e.g., from a camera 302) to determine the direction of lean of at least one stalk and/or determine whether an aggregate direction of lean of the stubble is forward, rearward, or mixed.

While determining the aggregate direction of lean/the direction of lean/the average direction of lean based on an image from each sensor (e.g., camera 302) is disclosed above, in certain embodiments, the controller 312 may be configured to determine the aggregate direction of lean and/or the average direction of lean based on multiple images from at least one sensor (e.g., camera 302). For example, in certain embodiments, the controller 312 may receive sensor signals indicative of multiple images of the stubble 22 (e.g., bare stalks 24 engaged with the soil 26) from a sensor (e.g., camera 302) over time (e.g., as a video). In such embodiments, the controller 312 may determine the aggregate direction of lean and/or the average direction of lean based on the images (e.g., by using the technique(s) disclosed above). Furthermore, as previously discussed, in certain embodiments, the stubble lean detection system (e.g., control system) 300 may include multiple sensors (e.g., camera(s) 302, lidar sensor(s), radar sensor(s)). In such embodiments, the controller 312 may receive sensor signals indicative of images of the stubble 22 (e.g., bare stalks 24 engaged with the soil 26) from the sensors, and the controller 312 may determine the aggregate direction of lean and/or the average direction of lean based on the images (e.g., by using the technique(s) disclosed above). In addition, in certain embodiments, the controller may receive sensor signals indicative of images of the stubble (e.g., bare stalks engaged with the soil) from multiple sensors over time. In such embodiments, the controller may determine the aggregate direction of lean and/or the average direction of lean based on the images (e.g., by using the technique(s) disclosed above).

In the illustrated embodiment, the stubble lean detection system 300 includes a user interface 318 communicatively coupled to the controller 312. The user interface 318 is configured to receive input from an operator and to provide information to the operator. The user interface 318 may include any suitable input device(s) for receiving input, such as a keyboard, a mouse, button(s), switch(es), knob(s), other suitable input device(s), or a combination thereof. In addition, the user interface 318 may include any suitable output device(s) for presenting information to the operator, such as speaker(s), indicator light(s), other suitable output device(s), or a combination thereof. In the illustrated embodiment, the user interface 318 includes a display 320 configured to present visual information to the operator. In certain embodiments, the display 320 may include a touchscreen interface configured to receive input from the operator.

In certain embodiments, the controller 312 is configured to output an information signal to the user interface 318 indicative of instructions to inform the operator of the direction of lean of the stubble 22/bare stalk(s) 24 engaged with the soil 26. For example, in certain embodiments, the controller 312 is configured to determine whether the aggregate direction of lean of the stubble 22 is forward, rearward, or mixed. In such embodiments, the controller 312 may output the information signal to the user interface 318 indicative of instructions to inform the operator of the aggregate direction of lean of the stubble 22. Furthermore, in certain embodiments, the controller 312 is configured to determine the direction of lean of a bare stalk engaged with the soil (e.g., whether the bare stalk is leaning forwardly or rearwardly, an angle of the bare stalk relative to the direction of travel). In such embodiments, the controller 312 may output the information signal to the user interface 318 indicative of instructions to inform the operator of the direction of lean of the bare stalk engaged with the soil. In addition, in certain embodiments, the controller 312 is configured to determine an average direction of lean of the bare stalks engaged with the soil relative to the direction of travel. The controller may also be configured to determine whether the average direction of lean is forward or rearward based on the average direction of lean relative to the direction of travel. In such embodiments, the controller 312 may output the information signal to the user interface 318 indicative of instructions to inform the operator of the average direction of lean and/or whether the average direction of lean is forward or rearward.

In certain embodiments, the controller 312 is configured to control the conveyance speed of the stalks relative to the agricultural field based on the aggregate direction of lean of the stubble. Furthermore, in certain embodiments, the controller 312 is configured to control the conveyance speed of the stalks relative to the agricultural field based on the direction of lean of a bare stalk engaged with the soil. In addition, in certain embodiments, the controller 312 is configured to control the conveyance speed of the stalks relative to the agricultural field based on the average direction of lean of the stubble (e.g., bare stalks engaged with the soil).

The conveyance speed may be controlled by controlling the ground speed of the agricultural harvester, a pitch angle of the feed rollers relative to the agricultural field, a speed of the feed rollers, other suitable operational parameter(s), or a combination thereof. In the illustrated embodiment, the stubble lean detection system (e.g., control system) 300 includes an agricultural harvester speed control system 322. The agricultural harvester speed control system 322 is communicatively coupled to the controller 312 and configured to control a ground speed of the agricultural harvester (e.g., along the direction of travel 16). The agricultural harvester speed control system 322 may include any suitable component(s) configured to control the ground speed of the agricultural harvester, such as electric motor(s), electric motor controller(s), hydraulic motor(s), hydraulic pump(s), hydraulic valve(s), hydraulic valve controller(s), internal combustion engine(s), transmission(s), clutch(es), other suitable component(s), or a combination thereof. In certain embodiments, the controller 312 may be configured to control the agricultural harvester speed control system 322 to decrease the ground speed of the agricultural harvester (e.g., along the direction of travel 16) in response to determining the aggregate direction of lean is forward/the direction of lean is forward/the average direction of lean is forward, and the controller 312 may be configured to control the agricultural harvester speed control system 322 to increase the ground speed of the agricultural harvester (e.g., along the direction of travel 16) in response to determining the aggregate direction of lean is rearward/the direction of lean is rearward/the average direction of lean is rearward.

In certain embodiments, the controller may be configured to increase/decrease the ground speed of the agricultural harvester in fixed increments. For example, the fixed increment may be input by the operator via the user interface. Accordingly, the controller may increase or decrease the ground speed of the agricultural harvester in fixed increments until the aggregate direction of lean is mixed, until an angle of a bare stalk engaged with the soil relative to the direction of travel is within a target range, or the average direction of lean relative to the direction of travel is within the target range. For example, the target range may be 60 degrees to 120 degrees relative to the direction of travel, 70 degrees to 110 degrees relative to the direction of travel, or 80 degrees to 100 degrees relative to the direction of travel. Furthermore, in certain embodiments, the controller may be configured to increase/decrease the ground speed of the agricultural harvester in variable increments. For example, the controller may determine the variable increment based on the portion of the bare stalks engaged with the soil leaning forwardly compared to the portion of the bare stalks engaged with the soil leaning rearwardly, the angle of a bare stalk engaged with the soil relative to the direction of travel, or the average direction of lean relative to the direction of travel. The variable increment may be larger if the difference between the portion of the bare stalks engaged with the soil leaning forwardly and the portion of the bare stalks engaged with the soil leaning rearwardly is greater, if the angle of the bare stalk engaged with the soil relative to the direction of travel is farther from the target range, or if the average direction of lean relative to the direction of travel is farther from the target range. The controller may increase or decrease the ground speed of the agricultural harvester in variable increment(s) until the aggregate direction of lean is mixed, until an angle of the bare stalk engaged with the soil relative to the direction of travel is within the target range, or the average direction of lean relative to the direction of travel is within the target range.

In the illustrated embodiment, the stubble lean detection system (e.g., control system) 300 includes a feed roller angle actuator 324. The feed roller angle actuator 324 is communicatively coupled to the controller 312 and configured to control a pitch angle 30 of the feed rollers 212 relative to the agricultural field 28. As used herein, "pitch" refers to rotation (e.g., of the feed rollers) about the lateral axis 10 of the corn header 200. The feed roller angle actuator 324 may include any suitable component(s) configured to control the pitch angle 30 of the feed rollers 212 relative to the agricultural field 28 (e.g., by driving the corn header 200 to rotate about the lateral axis 10 relative to the chassis of the agricultural harvester), such as hydraulic cylinder(s), hydraulic motor(s), electric linear actuator(s), electric motor(s), pneumatic cylinder(s), pneumatic motor(s), other suitable component(s), or a combination thereof. In certain embodiments, the controller 312 may be configured to control the feed roller angle actuator 324 to increase the pitch angle 30 of the feed rollers 212 relative to the agricultural field 28 in response to determining the aggregate direction of lean is forward/the direction of lean is forward/ the average direction of lean is forward, and the controller 312 may be configured to control the feed roller angle actuator 324 to decrease the pitch angle 30 of the feed rollers 212 relative to the agricultural field 28 in response to determining the aggregate direction of lean is rearward/the direction of lean is rearward/the average direction of lean is rearward.

In certain embodiments, the controller may be configured to increase/decrease the pitch angle of the feed rollers in fixed increments. For example, the fixed increment may be input by the operator via the user interface. Accordingly, the controller may increase or decrease the pitch angle of the feed rollers in fixed increments until the aggregate direction of lean is mixed, until an angle of a bare stalk engaged with the soil relative to the direction of travel is within a target range, or the average direction of lean relative to the direction of travel is within the target range. For example, the target range may be 60 degrees to 120 degrees relative to the direction of travel, 70 degrees to 110 degrees relative to the direction of travel, or 80 degrees to 100 degrees relative to the direction of travel. Furthermore, in certain embodiments, the controller may be configured to increase/ decrease the pitch angle of the feed rollers in variable increments. For example, the controller may determine the variable increment based on the portion of the bare stalks engaged with the soil leaning forwardly compared to the portion of the bare stalks engaged with the soil leaning rearwardly, the angle of a bare stalk engaged with the soil relative to the direction of travel, or the average direction of lean relative to the direction of travel. The variable increment may be larger if the difference between the portion of the bare stalks engaged with the soil leaning forwardly and the portion of the bare stalks engaged with the soil leaning rearwardly is greater, if the angle of the bare stalk engaged with the soil relative to the direction of travel is farther from the target range, or if the average direction of lean relative to the direction of travel is farther from the target range. The controller may increase or decrease the pitch angle of the feed rollers in variable increment(s) until the aggregate direction of lean is mixed, until an angle of the bare stalk engaged with the soil relative to the direction of travel is within the target range, or the average direction of lean relative to the direction of travel is within the target range.

In the illustrated embodiment, the stubble lean detection system (e.g., control system) 300 includes a feed roller speed actuator 326. The feed roller speed actuator 326 is communicatively coupled to the controller 312 and configured to control a speed (e.g., rotational speed) of the feed rollers 212. The feed roller speed actuator 326 may include any suitable component(s) configured to control the speed of the feed rollers 212, such as electric motor(s), electric motor controller(s), hydraulic motor(s), hydraulic pump(s), hydraulic valve(s), hydraulic valve controller(s), clutch(es) (e.g., between a power-take-off shaft and one or more feed rollers), transmission(s) (e.g., between a power-take-off shaft and one or more feed rollers), other suitable component(s), or a combination thereof. In certain embodiments, the controller 312 may be configured to control the feed roller speed actuator 326 to increase the speed of the feed rollers 212 in response to determining the aggregate direction of lean is forward/the direction of lean is forward/ the average direction of lean is forward, and the controller 312 may be configured to control the feed roller speed actuator 326 to decrease the speed of the feed rollers 212 in response to determining the aggregate direction of lean is rearward/the direction of lean is rearward/the average direction of lean is rearward.

In certain embodiments, the controller may be configured to increase/decrease the speed of the feed rollers in fixed increments. For example, the fixed increment may be input by the operator via the user interface. Accordingly, the controller may increase or decrease the speed of the feed rollers in fixed increments until the aggregate direction of lean is mixed, until an angle of a bare stalk engaged with the soil relative to the direction of travel is within a target range, or the average direction of lean relative to the direction of travel is within the target range. For example, the target range may be 60 degrees to 120 degrees relative to the direction of travel, 70 degrees to 110 degrees relative to the direction of travel, or 80 degrees to 100 degrees relative to the direction of travel. Furthermore, in certain embodiments, the controller may be configured to increase/decrease the speed of the feed rollers in variable increments. For example, the controller may determine the variable increment based on the portion of the bare stalks engaged with the soil leaning forwardly compared to the portion of the bare stalks engaged with the soil leaning rearwardly, the angle of a bare stalk engaged with the soil relative to the direction of travel, or the average direction of lean relative to the direction of travel. The variable increment may be larger if the difference between the portion of the bare stalks engaged with the soil leaning forwardly and the portion of the bare stalks engaged with the soil leaning rearwardly is greater, if the angle of the bare stalk engaged with the soil relative to the direction of travel is farther from the target range, or if the average direction of lean relative to the direction of travel is farther from the target range. The controller may increase or decrease the speed of the feed rollers in variable increment(s) until the aggregate direction of lean is mixed, until an angle of the bare stalk engaged with the soil relative to the direction of travel is within the target range, or the average direction of lean relative to the direction of travel is within the target range.

In certain embodiments, the corn header may include choppers positioned below the row units. The choppers are configured to chop the stalk into multiple pieces as the stalk passes through the feed rollers. Accordingly, a portion of the bare stalk is chopped into residue, and the remainder of the bare stalk remains engaged with the soil. As such, in embodiments in which the corn header includes choppers, the remainder of the bare stalk engaged with the soil corresponds to the bare stalk engaged with the soil disclosed herein. The stubble lean detection system (e.g., control system) disclosed herein may be utilized for headers that do not include choppers and headers that include choppers.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system for an agricultural harvester, comprising:

a controller comprising a memory and a processor, wherein the controller is configured to:

receive a sensor signal indicative of an image of stubble within an agricultural field;

determine whether an aggregate direction of lean of the stubble is forward, rearward, or mixed based on the image; and control a conveyance speed of stalks relative to the agricultural field based on the aggregate direction of lean.

2. The control system of claim 1, wherein the controller is configured to control a ground speed of the agricultural harvester, a pitch angle of feed rollers relative to the agricultural field, a speed of the feed rollers, or a combination thereof, to control the conveyance speed of the stalks.

3. The control system of claim 2, comprising an agricultural harvester speed control system communicatively coupled to the controller, wherein the controller is configured to control the agricultural harvester speed control system to decrease the ground speed of the agricultural harvester in response to determining the aggregate direction of lean is forward, and the controller is configured to control the agricultural harvester speed control system to increase the ground speed of the agricultural harvester in response to determining the aggregate direction of lean is rearward.

4. The control system of claim 2, comprising a feed roller angle actuator communicatively coupled to the controller, wherein the controller is configured to control the feed roller angle actuator to increase the pitch angle of the feed rollers relative to the agricultural field in response to determining the aggregate direction of lean is forward, and the controller is configured to control the feed roller angle actuator to decrease the pitch angle of the feed rollers relative to the agricultural field in response to determining the aggregate direction of lean is rearward.

5. The control system of claim 2, comprising a feed roller speed actuator communicatively coupled to the controller, wherein the controller is configured to control the feed roller speed actuator to increase the speed of the feed rollers in response to determining the aggregate direction of lean is forward, and the controller is configured to control the feed roller speed actuator to decrease the speed of the feed rollers in response to determining the aggregate direction of lean is rearward.

6. The control system of claim 1, wherein the controller is configured to determine whether the aggregate direction of lean of the stubble is forward, rearward, or mixed via machine learning.

7. The control system of claim 1, comprising a camera communicatively coupled to the controller, wherein the camera is configured to output the sensor signal.

8. The control system of claim 7, wherein the camera is configured to be directed toward a region of the agricultural field between a header and a crop residue spreading system of the agricultural harvester.

9. The control system of claim 7, wherein the camera is configured to be directed generally along a lateral axis of the agricultural harvester, the camera is configured to be positioned below a center of the agricultural harvester along a vertical axis of the agricultural harvester, or a combination thereof.

10. The control system of claim 7, wherein the camera is configured to be directed toward an element of the agricultural harvester positioned on an opposite side of the stubble from the camera, the camera has a depth of field less than 3 meters, or a combination thereof.

11. The control system of claim 1, wherein the controller is configured to output an information signal to a user interface indicative of instructions to inform an operator of the aggregate direction of lean.

12. The control system of claim 1, wherein the controller is configured to:

determine an average direction of lean of the stubble relative to a direction of travel of the agricultural harvester based on the image; and output an information signal to a user interface indicative of instructions to inform an operator of the average direction of lean.

13. A stubble lean detection system for an agricultural harvester, comprising:

a controller comprising a memory and a processor, wherein the controller is configured to:

receive a sensor signal indicative of an image of at least one bare stalk engaged with soil of an agricultural field;

determine a direction of lean of the at least one bare stalk based on the image; and control a conveyance speed of stalks relative to the agricultural field based on the direction of lean.

14. The stubble lean detection system of claim 13, comprising a camera communicatively coupled to the controller;

wherein the camera is configured to output the sensor signal; and wherein the camera is configured to be directed toward a region of the agricultural field between a header and a crop residue spreading system of the agricultural harvester, the camera is configured to be directed generally along a lateral axis of the agricultural harvester, the camera is configured to be positioned below a center of the agricultural harvester along a vertical axis of the agricultural harvester, the camera is configured to be directed toward an element of the agricultural harvester positioned on an opposite side of the at least one bare stalk from the camera, the camera has a depth of field less than 3 meters, or a combination thereof.

15. The stubble lean detection system of claim 13, wherein the at least one bare stalk comprises a plurality of bare stalks; and wherein the direction of lean corresponds to an aggregate direction of lean of the plurality of bare stalks, or the direction of lean corresponds to an average direction of lean of the plurality of bare stalks.

16. The stubble lean detection system of claim 13, wherein the controller is configured to determine the direction of lean of the at least one bare stalk via machine learning.

17. The stubble lean detection system of claim 13, wherein the controller is configured to control the conveyance speed of the stalks by controlling a ground speed of the agricultural harvester, a pitch angle of feed rollers relative to the agricultural field, a speed of the feed rollers, or a combination thereof.

18. The stubble lean detection system of claim 13, wherein the controller is configured to output an information signal to a user interface indicative of instructions to inform an operator of the direction of lean.

* * * * *